United States Patent [19]

Hepner et al.

[11] 4,221,460

[45] Sep. 9, 1980

[54] ARRANGEMENT FOR TRANSMITTING POLARIZED OPTICAL RADIATIONS

[75] Inventors: Georges Hepner; Jean-Paul Castéra, both of Paris, France

[73] Assignee: Thomson-CSF, Paris, France

[21] Appl. No.: 941,572

[22] Filed: Sep. 12, 1978

[30] Foreign Application Priority Data

Sep. 16, 1977 [FR] France ................................ 77 28065

[51] Int. Cl.$^2$ .............................................. G02B 5/14
[52] U.S. Cl. .................................................. 350/96.13
[58] Field of Search ................ 350/96.11, 96.13, 96.14

[56] References Cited

U.S. PATENT DOCUMENTS

| | | | |
|---|---|---|---|
| 3,990,776 | 11/1976 | Tseng et al. ....................... | 350/96.13 |
| 4,148,556 | 4/1979 | Sauter et al. ...................... | 350/96.13 |
| 4,153,329 | 5/1979 | Gillette ............................. | 350/96.13 |

*Primary Examiner*—Stewart J. Levy
*Attorney, Agent, or Firm*—Cushman, Darby & Cushman

[57] ABSTRACT

The arrangement according to the invention comprises three branches 1, 2 and 3 and enables a polarized radiation to be transmitted from the branch 1 towards the branch 2 or from the branch 2 towards the branch 3. It comprises polarization separating means forming a fork between the branches 1 and 3 on the one hand and the branch 2 on the other hand, the common section of said fork communicating with the branch 2 through non-reciprocal means which turn the polarization of the radiation through 45°.

19 Claims, 12 Drawing Figures

ARRANGEMENT FOR TRANSMITTING POLARIZED OPTICAL RADIATIONS

FIELD OF THE INVENTION

This invention relates to the transmission of optical radiation.

BACKGROUND OF THE INVENTION

It is of advantage for the transmission of information to use optical carrier waves extending from the infrared to the ultra-violet radiations and with which it is possible to obtain bandwidths considerably greater than those obtained with conventional electronic systems. It is known that optical modulators can be produced by utilising electrical or magnetic effects. Connections from one point to another are also currently being established by means of optical fibres. Finally, the detection of optical radiation is also possible.

By contrast, there are at present few arrangements for directing the exchanges of optical radiation between emission and detection.

For this purpose, an advantageous basic arrangement is an arrangement performing the function of an optical circulator which is a non-reciprocal arrangement, that is to say an arrangement of which the ways of transmission are not the same according to the direction and the polarization of the incident radiations.

It is already known that a birefringent element may transmit luminous rays in different directions depending upon the polarization of the rays. For example, a uniaxial material deflects the so-called "extraordinary" rays but does not deflect the so-called "ordinary" rays. For turning the polarization of rays, there are reciprocal elements which are made of a naturally birefringent material, such as half-wave plates, quarter-wave plates, etc. Reciprocal elements transmit the rays in both ways of a given direction and, by a good choice of the orientation of the axis and the direction of propagation, can turn the polarization of an incident ray through a constant angle in opposite ways for opposite ways of transmission. At the contrary, there are non-reciprocal element made in materials in which a birefringence is produced by an exterior electromagnetic field. For instance, by creating a magnetic field around certain magnetic materials, one can obtain a Faraday-effect rotator which turns the polarization of an incident ray through an angle of which the value depends upon the propagation length in the rotator and the way does not depend upon the way of transmission in the rotator. Intrinsically and produced birefringent plates can be made in a bulk or a thin layer technology.

SUMMARY OF THE INVENTION

An object of the invention is a transmission system comprising such birefringent plates arranged in such a way as to obtain an optical circulator.

Another object of the invention is the multiplexing and demultiplexing of optical radiation with a system comprising optical circulators.

Another object of the invention concerns a system establishing a communication in both directions by a single optical fibre between two stations respectively equipped with an emitter and a receiver of modulated light.

BRIEF DESCRIPTION OF THE DRAWINGS

For a better understanding of the invention and to show how the same may be carried into effect, reference will be made to the following description in conjunction with the accompanying drawing in which.

DESCRIPTION OF PREFERRED EMBODIMENTS

Figure 1:
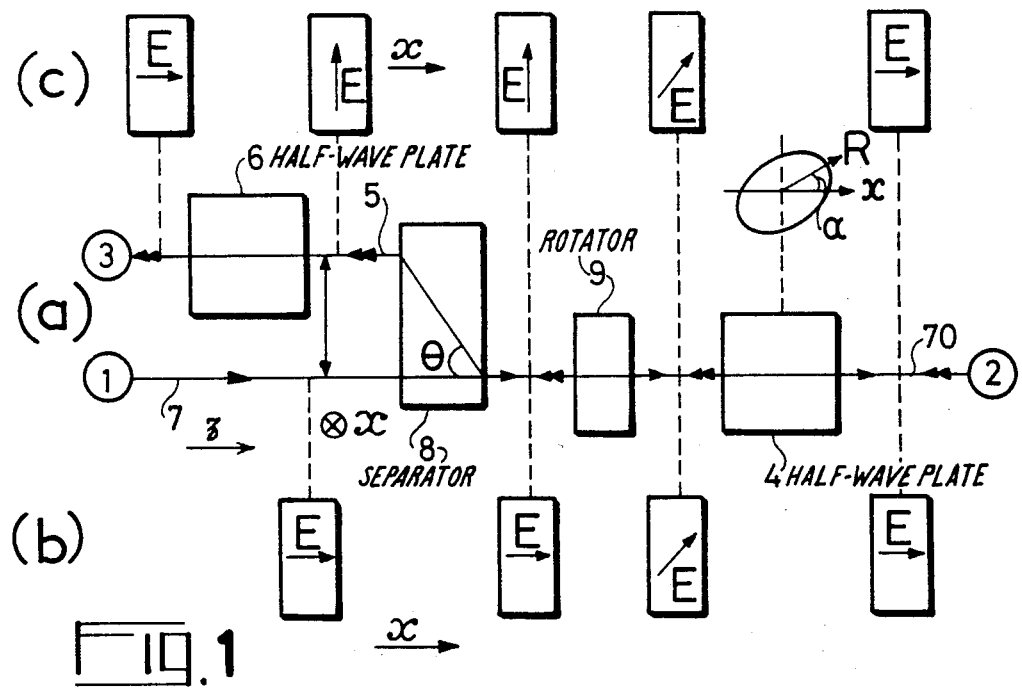
FIG. 1 shows a general plan of an optical circulator according to the invention.

FIG. 1 shows the general plane of the non-reciprocal optical arrangement according to the invention. Radiated energy entering by a channel 1 is collected in a channel 2, whilst energy entering by the channel 2 is received in a channel 3 separate from the channel 1. The figure shows the direction of the electrical field E of the wave in a plane perpendicular to the directions of propagation of the energy in the two transmission directions at different points of the circulator; at the bottom of the figure moving away from the channel 1 towards the channel 2 and at the top of the figure moving away from the channel 2 towards the channel 3. A substantially monochromatic radiation 7 entering by the channel 1 and polarized in a direction x perpendicular to the direction of propagation z passes through a polarization separator 8 made of a uniaxial material which allows an ordinary ray to pass through without deflecting it, whereas it deflects an extraordinary ray. The polarization of the radiation 7 is made that of an ordinary ray. Accordingly, it is not deflected. It then passes through a non-reciprocal element 9 of the Faraday-effect rotator type of which the function is to rotate the polarization of the wave passing through it through an angle of 45°. The element 9 turns in one direction only, irrespective of the direction in which it is traversed by the wave. At the exit of the element 9, the field E of the optical carrier wave forms an angle of 45° with the direction x. The radiation then passes through a half-wave plate 4 of which section of the wave surface in a plane perpendicular to the direction of propagation is represented. Its rapid axis R forms an angle α equal to 22.5° with the direction x so that, on exit, the field E is again parallel to x. The radiation collected in the channel 2 therefore has the same polarization as the incident radiation 7. A radiation 70 polarized parallel to x arriving on the channel 2 passes through the half-wave plate 4 which causes the field E to turn through 45° in the opposite direction to before. By contrast, the non-reciprocal element 9 causes it to turn through 45° in the same direction as before so that the field E of the radiation, after passing through the element 9, is directed in a direction y perpendicular to the direction x. The radiation passes through the separator 8 in the form of an extraordinary ray. It is thus deflected through an angle θ by the separator so that a radiation 5 following a different path from the radiation 7 is obtained at the exit of the separator. In the particular case of the Figure, where the separator 8 is a plate having parallel faces, the paths followed by the radiations 5 and 7 are parallel and spaced by a distance d which depends upon the angle θ and the thickness of the plate 8. A half-wave plate 6, of which the rapid axis forms an angle of 45° with the axis x, enables a radiation polarized parallel to x to be collected on the channel 3. The use of the half-wave plates 4 and 6 makes it possible to have the same polarization on the channels 1, 2 and 3, although they are not indispensable for the only circulator function.

Figure 2:
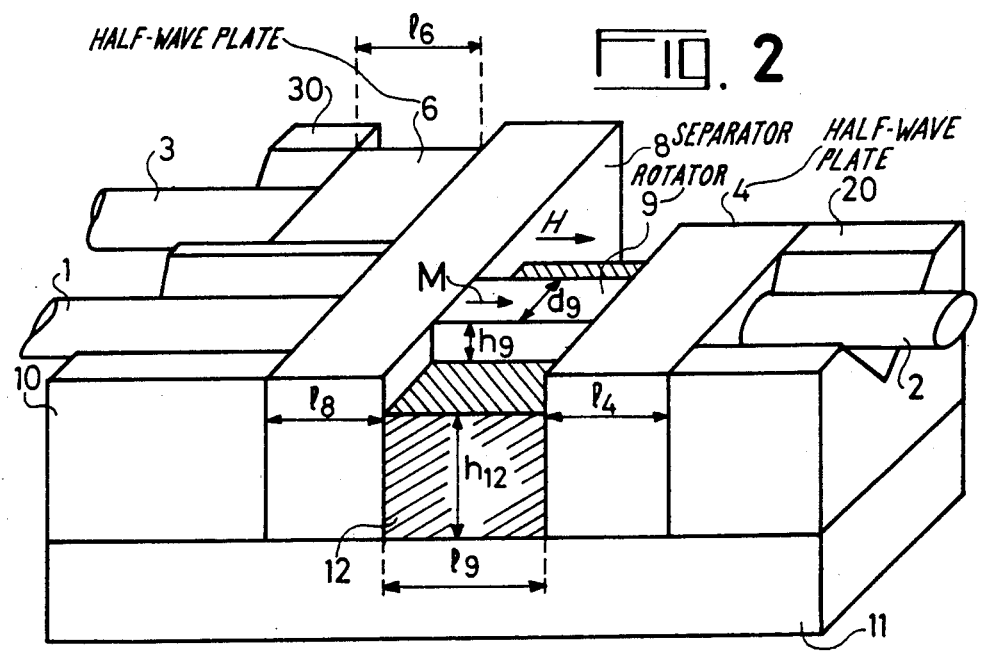
FIG. 2 shows one embodiment of the circulator.

FIG. 2 shows one embodiment of the arrangement diagrammatically illustrated in FIG. 1, the various elements being denoted by the same reference numerals in the two figures. The elements are juxtaposed on a base 11. The channels 1, 2 and 3 are materialized by optical fibres respectively placed in supports 10, 20, 30, which ensures permanent alignment. The separator 8 is formed by a plate for a birefractive material, for example rutile, having a length $l_8$ sufficient for the fibres 1 and 3 to be cleanly separated. It depends upon the deflexion angle θ which depends upon the characteristics of the material and the cut of the plate. The non-reciprocal element 9 is formed by a layer of a ferrimagnetic garnet having a thickness $h_9$ deposited on a substrate 12 formed for example by a garnet of gadolinium and gallium (GGG) and having a thickness $h_{12}$. The layer 9 may be formed by a garnet of yttrium and iron (YIG), preferably with substitutions of certan yttrium and/or iron atoms so that the direction of magnetisation of the material is contained in the plane of the layer 9, and may be epitaxied on the substrate 12. The width $d_9$ of the layer and the thicknesses $h_9$ and $h_{12}$ are preferably selected to be just sufficient for all the radiated energy issuing from the fibres to be able to be propagated in the layer 9. The magnetization M of the layer 9 is directed parallel to the direction of propagation with a magnetic field H created by conventional electromagnetic means (not shown in the figure), for example a coil traversed by an electrical current. The length $l_9$ common to the substrate 12 and the layer 9 is such that the angle of rotation of the polarization is equal to 45°. It is known indeed that this angle is proportional to the length traversed. The half-wave plates 4 and 6 are made of a birefractive material, for example quartz. The lengths $l_4$ and $l_6$ of these plates, which may be equal, are such that the difference in trajectory which they introduce is an odd multiple of half the wavelength λ of the propagated light. Taking into account the materials used, the arrangement may be used with advantage in infrared radiation. By way of non-limiting example the arrangement shown in FIG. 2 may be formed as follows: the fibres 1, 2, 3 have a diameter of 50 μm. The plate 8 is made of rutile and is cut in such a way that its incidence and emergence faces form with its optical axis an angle such that the deflection angle θ is maximal. Thus, θ=0.1 rad; its length $l_8$ is 1 mm which, for the distances between the axes of the fibres 1 and 3, gives d=100 μm. The substrate 12 of GGG has a thickness $h_{12}$ of 500 μm. The layer 9 of YIG has a thickness $h_9$ of 50 μm; substitutions by terbium atoms enable a Faraday constant of approximately 400°/cm to be obtained; to obtain an angle of 45°, the length $l_9$ is about 1 millimeter; the width $d_9$ is at least equal to the diameter of the fibres 1 and 2, i.e $d_9$=50 μm. The plate 4 is made of quartz; it is cut in such a way that its rapid axis is perpendicular to the direction of propagation and forms an angle of 22.5° with the direction x; its length $l_4$ is such that $$\frac{(ne - no) l_4}{\frac{\lambda}{2}} = 2k + 1,$$

ne and no being its extraordinary and ordinary indices and k an integer; where λ=1 μm and k=3, $l_4$ is about 100 μm. The plate 6 is also made of quartz and its length $l_6$ is equal to $l_4$; it is cut in such a way that its rapid axis is perpendicular to the direction of propagation and forms an angle ot 45° with the direction x. The supports 10, 20, 30 are advantageously formed by a deposit to silicon intended to obtain the desired V-shaped depressions.

Figure 3:
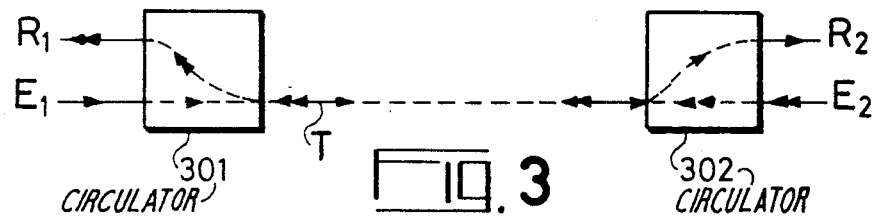
FIG. 3 shows the layout of an arrangement for transmitting optical energy in both directions by a single optical fibre.
Figure 4:
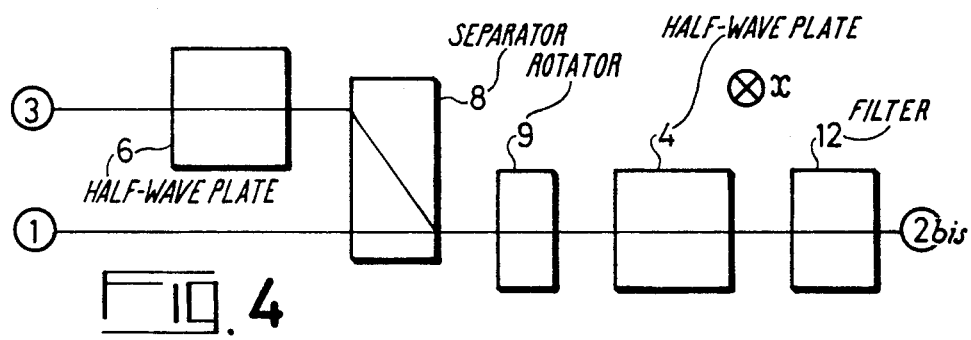
FIG. 4 shows the layout of a two waves multiplexer or demultiplexer.

FIG. 3 shows the plan of a first application of the circulator according to the invention. The application in question is the connection by a single link of two stations each equipped with an emitter and a receiver. The arrangement uses two non-reciprocal devices 301 and 302 similar to the device shown in FIGS. 1 and 2. Optical energy may enter the circulator 301 by a channel $E_1$ and leave it by a channel T. It is then transmitted along the channel T and received by the circulator 302 which its leaves by a channel $R_2$. In the opposite direction, radiated energy may enter the circulator 302 by a channel $E_2$, may be transmitted by the same channel T as before, may enter the circulator 301 and may leave it by a channel $R_1$. The channels $E_1$, T, $R_1$ for the circulator 301 and the channels $E_2$, T, $R_2$ for the circulator 302 respectively perform the functions of the channels 1, 2 and 3 of FIG. 1. These channels are materialized for example by fibres. The channels $E_1$ and $E_2$ are intended to be connected to optical sources, with which means are generally associated for modulating the optical energy by an item of information to be transmitted. The channels $R_1$ and $R_2$ are intended to be connected to radiation detectors associated with means for restoring the information carried by the rediated wave. A compact, inexpensive transmission system of this type may be used in particular in telephony. FIG. 4 diagrammatically illustrates a second application of the invention in the multiplexing and demultiplexing of radiated waves having separate carrier frequencies. The arrangement in question comprises a non-reciprocal device similar to that of FIG. 1 associated with selective light filters. The same elements as in FIG. 1 are denoted by the same references. For demultiplexing, an incident radiation polarized in the direction x and containing two carrier waves having wavelengths $\lambda_1$ and $\lambda_2$ is available in the channel 1. This radiation passes successively through the polarization separator 8, the rotator 9 and the half-wave plate 4. In the extension of this plate there is a filter 12 which is capable of reflecting the carrier wave of wavelength $\lambda_2$ and of transmitting the carrier wave of $\lambda_1$. The carrier wave of wavelength $\lambda_1$ is thus obtained at the output end of the filter on the channel 2 bis. The other carrier wave is reflected and passes back through the half-wave plate 4, the rotator 9 and the separator 8 as the radiation 70 of FIG. 1. It is deflected by the separator 8, passes through the half-wave plate 6 and is collected in the channel 3. The two carrier waves are thus separated from the incident radiation and collected on separate channels. Nevertheless, the satisfactory operation of this arrangement requires that the wavelengths $\lambda_1$ and $\lambda_2$ be sufficiently close for the response of the various elements, particularly the half-wave plates, to be substantially the same for the two carrier waves. By way of non-limiting example, the filters used enable the separation of waves having a wavelength of about the $\mu$m and having a difference $|\lambda_1-\lambda_2|$ of 1 Å, i.e. $|\lambda_1-\lambda_2|/\lambda_1=10^{-4}$. Various types of filters may be used for this two-waves demultiplexer: the filter used may be a low-pass filter or a high-pass filter having a cut-off wavelength between $\lambda_1$ or $\lambda_2$ and of which the bandwidth is smaller than $|\lambda_1-\lambda_2|$.

The arrangement diagrammatically illustrated in FIG. 4 may also be used for multiplexing two radiations having respective wavelengths $\lambda_1$ and $\lambda_2$ and respectively arriving on the channels 1 and 2 bis, both polarized in the direction x. The filter is selected to transmit the radiation of wave length $\lambda_2$ and to reflect the radiation of wavelength $\lambda_1$. The radiation arriving on the channel 1 passes through the separator 8 without being deflected, the rotator 9 and the half-wave 4. The outgoing radiation 1 is reflected by the filter 12 and passes back through the plate 4 and the rotator 9, on emerging from which its polarisation is perpendicular to x. Accordingly, it is deflected by the separator 8, passes through the half-wave plate 6 and is collected on the channel 3. The radiation arriving on the channel 2 bis is transmitted by the filter 12 and follows the same path as the first radiation. Accordingly, it is also collected on the channel 3 with the same polarization.

Figure 5:
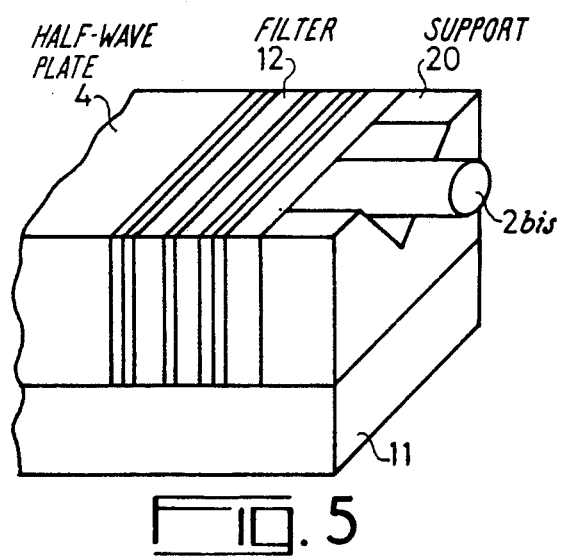
FIG. 5 shows one embodiment of a filter.
Figure 6:
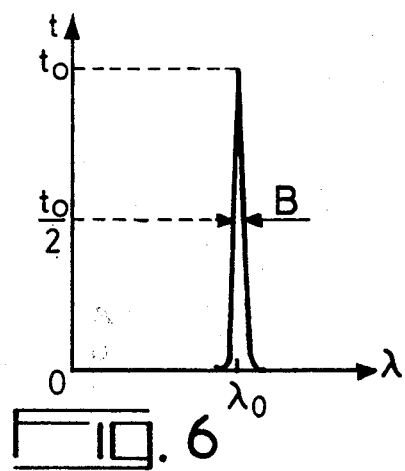
FIG. 6 its transmission wave.

FIG. 5 shows one embodiment of a filter mounted on the base 11 of FIG. 2 between the plate 4 and the fibre support 20. The filter in question is a multilayer interference one. The thickness of the layers and their composition are selected to obtain the required response curve. One type of response curve representing the transmission coefficient t of the filter 12 as a function of the wavelength $\lambda$ is shown in FIG. 6. In this case, the filter in question is a band-pass filter having a resonance wavelength $\lambda_0$ for which $t=t_0$ next to 1. The bandwidth at 3 dB, B, is defined for $t=t_0/2$. B and $\lambda_0$ are selected in such a way that one of the values $\lambda_1$ or $\lambda_2$ is comprised within the pass band, the other being outside that band.

Figure 7:
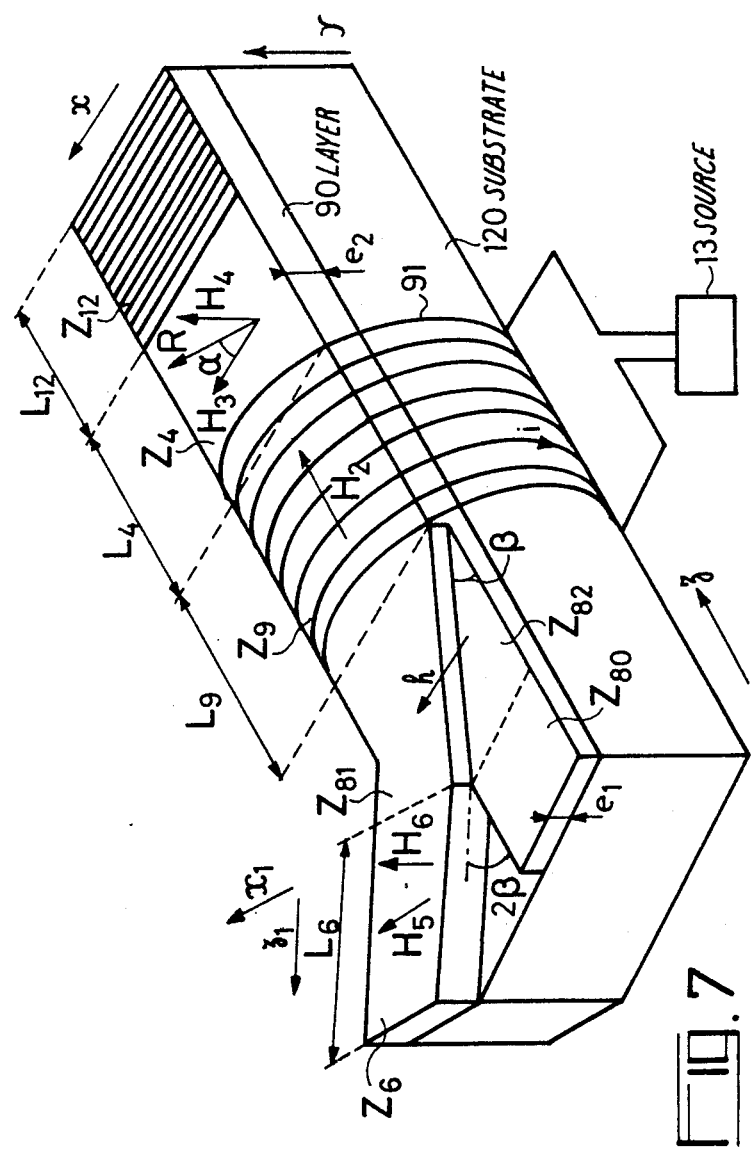
FIG. 7 shows another embodiment of a multiplexer-demultiplexer.

FIG. 7 shows another embodiment of a multiplexer/demultiplexer using the guiding of optical energy in thin magnetic layers deposited on a substrate. The structure comprises a substrate 120, made for example of a garnet of gadolinium and gallium and a layer 90, epitaxied on the substrate 120, of a material preferably formed by a ferrimagnetic garnet, for example a garnet of yttrium and iron with substituted atoms of gadolinium and gallium, so that the direction of magnetisation of the material is contained in the plane of the layer. The thickness of the layer determines the number of modes capable of being propagated by total reflection at the substrate-layer and layer-air diopters. It can be seen from the Figure that this thickness is not the same for the structure as a whole, because the branch denoted by the reference 1 in FIG. 4 corresponds to a zone $Z_{80}$ of the layer of thickness $e_1$. The value of $e_1$ is selected in such a way that only the $TE_0$ mode can be propagated, $e_1$ being smaller than the thickness corresponding to cut-off for the $TM_0$ mode. Zones $Z_{81}$ and $Z_{82}$ of layer correspond to the polarization separator 8. The zone $Z_{82}$ extends the zone $Z_{80}$ and has the same thickness. The zone $Z_{81}$ which is adjacent to it has a thickness $e_2$ greater than $e_1$ so that the $TE_0$ and $TM_0$ modes can both be propagated there. The boundary between these two zones forms an angle $\beta$ with the general axis of the guide z which is the direction of propagation in the branch 1 and in the rest of the structure, except for the halfwave plate 6, as will be seen hereinafter. A radiation arriving in the zone $Z_{80}$ is then propagated into the zone 82 and then into zones $Z_9$, $Z_4$ and $Z_{12}$ of thickness $e_2$ which are situated in the extensions of one another in the direction z, with respective lengths of $L_9$, $L_4$ and $L_{12}$, and which respectively correspond to the non-reciprocal element 9, to the half-wave plate 4 and to the filter 12. A Faraday effect is obtained in the zone $Z_9$ by applying to it a constant magnetic field $H_2$ directed parallel to z by means of a coil 91 fed by a current i supplied by a current source 13. This magnetic field, by orienting the magnetization of the layer in the direction z, causes the polarization of the radiation propagated in the layer to be rotated through an angle which is proportional to the interaction length. The value of $L_9$ is selected in such a way that this angle is equal to 45°. The zone $Z_4$ is rendered birefractive by Cotton-Mouton effect by means of a magnetic field having a component $H_3$ along an axis x in the plane of the layer and perpendicular to z and a component $H_4$ perpendicular to the plane of the layer. The values of $H_3$ and $H_4$ are such that the direction R of the resultant magnetic field forms an angle $\alpha$ of 22.5° with the axis x whilst its value is sufficient for orienting the magnetization in the same direction. As already known, the layer then becomes birefractive, its rapid axis being in the direction R. The lengts $L_4$ is selected in such a way that the phase shift introduced by the zone $Z_4$ is equal to $(2k+1)\pi$. A half-wave plate is thus obtained. The zone $Z_{12}$ corresponding to the filter 12 is etched to form a lattice. The filter in question is a band-stop filter. The spacing of the lattice P and the number of lines N are selected in such a way that the filter reflects the radiations having a wavelength in a band of width B, so that $\lambda_2$ is comprised within the pass band and $\lambda_1$ is outside the pass band. The zone 12 has a length $L_{12}=NP$. The radiation reflected by the lattice is propagated in the opposite direction into the zones $Z_4$ and $Z_9$ and arrives on the zone $Z_{81}$ in the TM mode. For this mode, zones of thickness $e_2$ such as $Z_{81}$ present a guided propagation index $n_2$ and zones of thickness $e_1$, such as $Z_{82}$ present an index $n_1$ lower than n. The angle $\beta$ of the boundary between the zones $Z_{81}$ and $Z_{82}$ is selected with respect to the values $n_1$ and $n_2$ in such a way as to fulfill the condition of total reflection, i.e. $\beta<\beta_0$ with $\cos\beta_0=n_1/n_2$. Thus, the radiation coming from the zone $Z_9$ is totally reflected by the boundary and is only propagated into the zone $Z_{81}$ and then into a zone $Z_6$ of thickness $e_2$ which corresponds to the half-wave plate 6. The direction of propagation $z_1$ in the zone $Z_6$ forms an angle equal to $2\beta$ with the direction z. In the same way as for the zone 4, a birefraction is produced by Cotton-Mouton effect by means of a magnetic field having a component $H_5$ parallel to an axis $x_1$ situated in the plane of the layer and perpendicular to the propagation direction $z_1$ and a component $H_6$ perpendicular to the plane of the layer. $H_5=H_6$ directed in a direction y so that the rapid axis of the zone $Z_6$ is situated at 45° from $x_1$ and the length $L_6$ may be equal to $L_4$. To obtain the orientation of the magnetization in the zones $Z_{80}$, $Z_{81}$ and $Z_{82}$, a field h of low value directed parallel to x may be applied to these zones, enabling the Faraday effect and the Cotton-Mouton effect to be avoided in these zones. FIG. 7 shows zones clearly delimited by clean boundaries. This is true on the one hand if the thickness of the layers is sufficiently small for the magnetization to pass from one direction to another with a transition zone of negligible length and, on the other hand, if the magnetic fields applied in the various zones have a distribution with steep sides. The first condition is readily fulfilled: the layer thicknesses used are always minimal because it is desired to transmit the modes of order 0. The fulfillment of the second condition depends on the means for applying the magnetic fields. The means are not all shown in the figure in the interests of simplicity. The fields $H_3$, $H_4$, $H_5$, $H_6$ may be obtained by magnets for which the edge effects are negligible by comparison with the lengths used. For the coil 91, it had been verified that the distribution of the field $H_2$ is satisfactory if the length of the coil is considerably greater than its diameter, which is readily obtained by selecting the thickness of the substrate to be small in relation to the length $L_9$. By way of non-limiting example, the following values may be adopted for a layer 90 of YIG on a substrate 120 of GGG: $e_1 = 1$ μm; $e_2 = 5$ μm, $L_4 = L_6 = 10$ mm, $L_9 = L_{12} = 10$ mm, $N = 10^4$. This embodiment based on guided optics is of course applicable to the circulator shown in FIG. 1, provided that the zone $L_{12}$, i.e. filtering, is eliminated.

Figure 8:
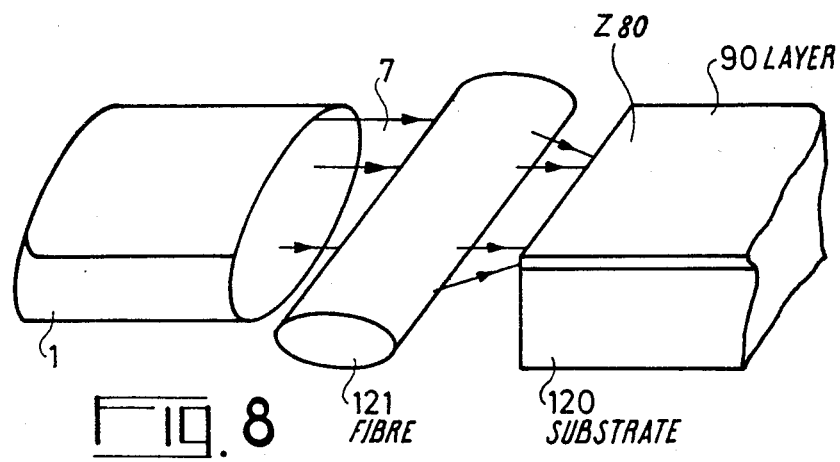
FIG. 8 shows one embodiment of the input or output means for the arrangement shown in FIG. 7.

The means by which the radiations enter and leave through the channels 1, 2, 3 are not shown in FIG. 7. Generally the light is transmitted by an optical fibre or by a bundle of fibres of which the diameter is considerably greater (around 50 times greater) than the thickness of the layer 20. FIG. 8 shows one embodiment of the means by which light enters (or leaves) through the channel 1. A cylindrical fibre 121, for example of glass, is arranged between the fibre 1 and the zone $Z_{80}$ of the demultiplexer (or multiplexer). This fibre is disposed transversely in relation to the fibre 1 so that it performs the function of a cylindrical lens. The light beam 7 issuing from the fibre 1, which is a parallel beam of circular cross-section, is flat after passage through the fibre 121. The demultiplexer and the fibre 121 are positioned in such a way that this flat beam arrives at the layer 90 with a small incidence angle (below the limiting total reflection angle) and has a thickness less than or equal to the thickness of the layer 120. Thus, a maximum of energy of the beam 7 enters the layer 90.

Figure 9:
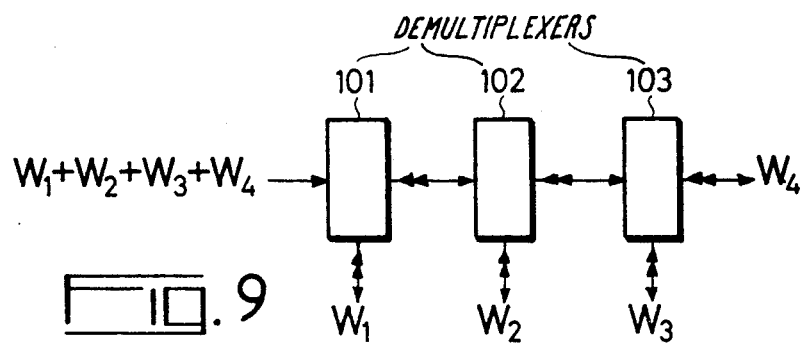
FIG. 9 shows an embodiment of a n-channels multiplexer/demultiplexer comprising structures arranged in series.
Figure 10:
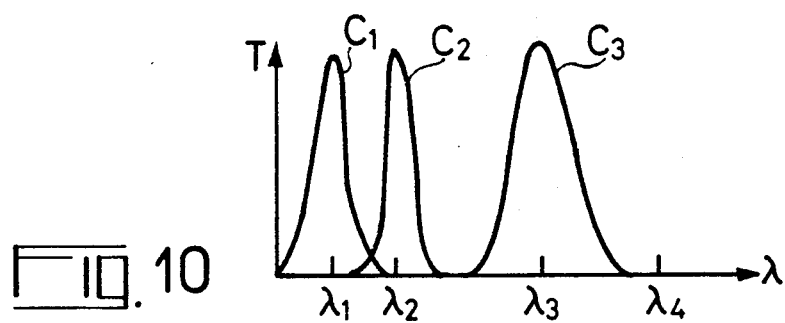
FIG. 10 shows the transmission curves of the filters comprised in the structures of FIG. 9.

By associating several two-channel multiplexers or demultiplexers of the type described above, an n-channel system is obtained. FIG. 9 shows an arrangement comprising three structures of the type shown in FIG. 4 placed in series: 101, 102, 103. In the case of demultiplexing, an incident radiation $W_1 + W_2 + W_3 + W_4$ containing four carrier waves $W_1$ to $W_4$ having respective wavelengths $\lambda_1$, $\lambda_2$, $\lambda_3$, $\lambda_4$ enters the structure 101 which comprises a selective filter tuned to the wavelength $\lambda_1$. Depending on the type of filter, the wave $W_1$ is the transmitted wave and the wave $W_2 + W_3 + W_4$ is the reflected wave, or vice versa. The structure 101 thus separates the carrier wave $W_1$ from the other three. The wave $W_2 + W_3 + W_4$ enters the structure 102 comprising a selective filter tuned to $\lambda_2$ which selects the wave $W_2$. Finally, the wave $W_3 + W_4$ enters the structure 103 which separates the carriers waves $W_3$ and $W_4$. FIG. 10 shows by way of example, on one and the same diagram, the transmission curves $C_1$, $C_2$, $C_3$ of the filters contained in the structures 101, 102, 103. This diagram relates to the case where the waves $W_1$, $W_2$, $W_3$ are respectively the waves transmitted by the filters of the structures 101, 102, 103.

Figure 11:
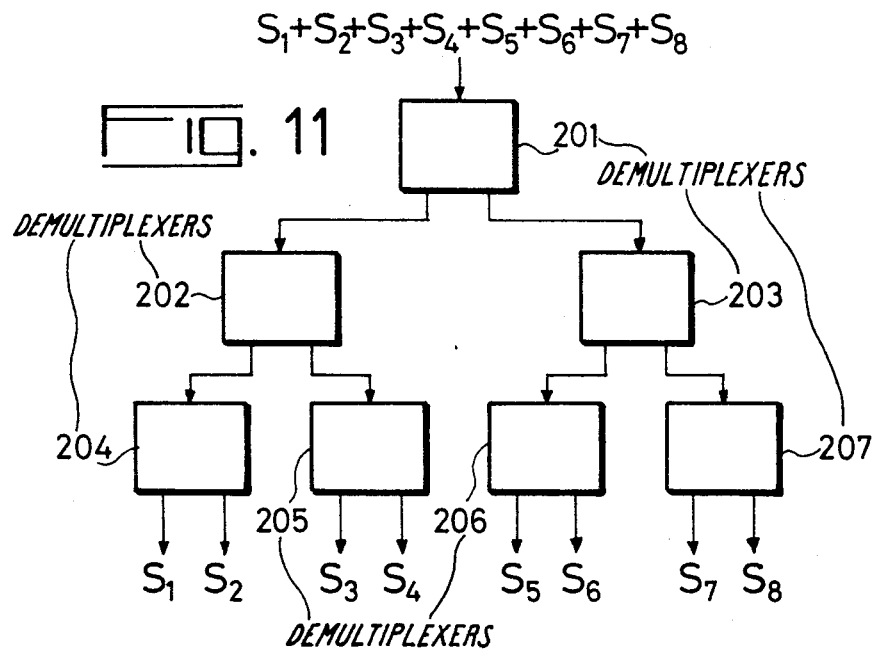
FIG. 11 shows another embodiment of a n-channels multiplexer/demultiplexer comprising structures arranged in parallel.
Figure 12:
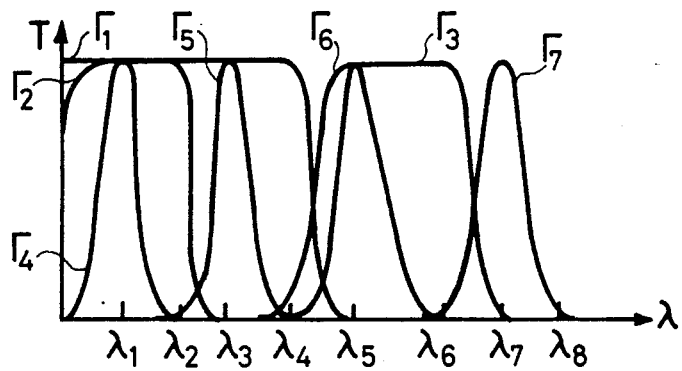
FIG. 12 shows the transmission curves of the filters comprised in the structures of FIG. 11.

FIG. 11 shows an eight-channel demultiplexer comprising seven demultiplexing structures 201 to 207 arranged in parallel. The incident radiation $S_1 + S_2 \ldots + S_8$ is composed of eight carrier waves $S_1$ to $S_8$ having increasing wavelengths $\lambda_1$ to $\lambda_8$. The transmission curves of the filters $\Gamma_1$ to $\Gamma_7$ are shown in FIG. 12. The demultiplexer 201 comprises a low-pass filter having a cut-off frequency between $\lambda_4$ and $\lambda_5$. Two waves are obtained, namely $S_1 + \ldots S_4$, which is delivered to the demultiplexer 202, and $S_5 + \ldots S_8$ which is delivered to the demultiplexer 203. Each demultiplexer reseparates the radiation received into two groups and the demultiplexer 204 to 207 enable the eight carrier waves $S_1$ to $S_8$ to be obtained on eight separate channels.

The arrangement shown in FIGS. 9 and 11 are given purely by way of non-limiting examplen and, by selecting the filters, any of the structures known in electronics may be used.

What we claim is:

1. An arrangement for transmitting polarized optical radiations between at least three channels (1), (2), and (3), so that radiations entering by channel (1) are collected in channel (2) and radiations entering by channel (2) are collected in channel (3); said arrangement comprising:

separation means, disposed in said channels (1) and (3), for directing said radiations incident thereon polarized in a first polarization direction x, in a first propagation direction z, between channels (1) and (2), and directing radiations polarized in a second polarization direction y in a direction $z_1$ different from said direction z, between channels (2) and (3), said direction y being perpendicular to said direction x;

first reciprocal radiation polarization rotating means, disposed in said channel (2), for rotating the direction of polarization of said radiations in said channel (2), the direction of said reciprocal rotating being the same for oppositely directed radiations in channel (2); and non-reciprocal radiation polarization rotating means, disposed in said channel (2) and coupling said separation means and said first reciprocal means, for rotating the direction of polarization of said radiations in said channel (2), the direction of said non-reciprocal rotating being opposite for oppositely directed radiations in channel (2).

2. An arrangement as claimed in claim 1, said arrangement further comprising second reciprocal polarization rotating means inserted between said separation means and one of said channels 1 and 3 in order to enable the same direction of polarization of the radiation to be obtained in channels 1, 2 and 3.

3. An arrangement as claimed in claim 2, wherein said non-reciprocal means comprise a magnetic material and means for inducing a magnetic field in said magnetic material.

4. An arrangement as claimed in claim 3, wherein said magnetic material is a thin layer deposited on a substrate.

5. An arrangement as claimed in claim 4, wherein said separation means comprise a plate with parallel faces made of a monoaxial material oriented in such a way that the polarization of the radiation travelling in one of said directions x and y corresponds to an ordinary ray, and the polarization of the radiation travelling in the other direction corresponds to an extraordinary ray.

6. An arrangement as claimed in claim 5, wherein said material is rutile.

7. An arrangement as claimed in claim 4, wherein said first and second reciprocal means are formed by half-wave plates made of a monoaxial material.

8. An arrangement as claimed in claim 7, wherein said material is quartz.

9. An arrangement as claimed in claim 4, wherein said separation means and said first and second reciprocal means are also made in said thin layer and form a first, a second and a third waveguide branches respectively connected to said channels 1, 2, 3 and to an intermediate guide section; said second branch being capable of propagating at least two modes of optical energy, said first and third branches being capable of propagating respectively said two modes; said intermediate guide section forming said separation means.

10. An arrangement as claimed in claim 9, wherein said substrate is made of a garnet of gadolinium and gallium.

11. An arrangement as claimed in claim 10, wherein said layer is made of a garnet of yttrium and iron with substituted atoms of gadolinium and gallium.

12. An arrangement as claimed in claim 10, wherein said layer is made of a garnet of yttrium and iron with substituted atoms of terbium.

13. An arrangement as claimed in claim 10, wherein said layer is deposited on said substrate by epitaxy.

14. An arrangement as claimed in claim 9, wherein said second branch and one of said first and third branches have a same first thickness, the other of said first and third branches having a second thickness; said intermediate guide section forming two zones having respectively said first and second thickness and being separated by a flat diopter which forms with the direction of propagation in said second branch an angle such that said diopter is totally reflecting for one of said two propagation modes.

15. An arrangement as claimed in claim 9, wherein said first and second reciprocal means comprise means for inducing a magnetic field perpendicular to the direction of propagation in said branch, said inducing means causing a birefraction of the layer by Coutton-Mouton effect.

16. A system for transmitting optical radiation enabling two stations respectively equipped with an emitter and a receiver of optical energy to be connected by a single channel T, wherein each of said stations comprises an arrangement as claimed in claim 1; the two ends of said channel T respectively forming said channel 2 of said arrangements.

17. A system for multiplexing and demultiplexing at least two optical carrier waves of different wavelength; said system comprising at least one arrangement as claimed in claim 1; said system further comprising selective filtering means connected to said first reciprocal means, reflecting radiations polarized according to one of said direction x and said perpendicular direction y and transmitting the other.

18. A system as claimed in claim 17, wherein said filtering means comprise a multilayer interference filter.

19. A system as claimed in claim 17, wherein said filtering means comprise a network.

* * * * *